(12) United States Patent
Yamazoe (10) Patent No.: US 7,961,366 B2
(45) Date of Patent: Jun. 14, 2011

(54) COLOR GAMUT MODIFICATION AND COLOR MAPPING METHOD AND APPARATUS

(75) Inventor: Manabu Yamazoe, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 476 days.

(21) Appl. No.: 11/421,298

(22) Filed: May 31, 2006

(65) Prior Publication Data

US 2006/0274340 A1 Dec. 7, 2006

(30) Foreign Application Priority Data

Jun. 2, 2005 (JP) ................................ 2005-163178

(51) Int. Cl.
*G03F 3/08* (2006.01)
(52) U.S. Cl. ........................................................ 358/519
(58) Field of Classification Search .................. 358/519; 345/590
See application file for complete search history.

(56) References Cited

U.S. PATENT DOCUMENTS

| 5,734,745 | A | * | 3/1998 | Ohneda | 382/167 |
| 5,982,925 | A | | 11/1999 | Koizumi | |
| 6,041,136 | A | * | 3/2000 | Ohga | 382/162 |
| 2003/0001860 | A1 | | 1/2003 | Yamazaki | |
| 2005/0073730 | A1 | * | 4/2005 | Huang et al. | 358/518 |
| 2005/0248784 | A1 | * | 11/2005 | Henley et al. | 358/1.9 |

FOREIGN PATENT DOCUMENTS

| JP | 63-132592 A | 6/1988 |
| JP | 06-315084 A | 11/1994 |
| JP | 9-163170 A | 6/1997 |
| JP | 2002-359748 A | 12/2002 |

* cited by examiner

*Primary Examiner* — Benny Q Tieu
*Assistant Examiner* — Jeremiah A Bryar
(74) *Attorney, Agent, or Firm* — Canon USA Inc. IP Division (57) ABSTRACT

An image processing method according to the present invention achieves gamut mapping between devices having different color reproduction ranges in gamut compression, and enables good color reproduction without reversal of tonal change. An image processing method converts a color signal representing a color in a first color gamut to a color signal representing a color in a color gamut of an image forming apparatus. The image processing method includes modifying a shape of the color gamut of the image forming apparatus according to a shape of the first color gamut, and converting a color signal representing a color in the first color gamut to a color signal representing a color in the color gamut of the image forming apparatus.

10 Claims, 8 Drawing Sheets

COLOR GAMUT MODIFICATION AND COLOR MAPPING METHOD AND APPARATUS

CROSS REFERENCE TO RELATED APPLICATIONS

This application claims priority from Japanese Patent Application No. 2005-163178 filed Jun. 2, 2005, which is hereby incorporated by reference herein in its entirety. This application is related to co-pending U.S. application Ser. No. 11/399,904 filed Apr. 7, 2006.

BACKGROUND OF THE INVENTION

1. Field of the Invention

The present invention relates to an image processing method, to a profile generation method, and to an image processing apparatus. More particularly, the present invention relates to gamut mapping used in a color conversion profile.

2. Description of the Related Art

Recently, digital devices, such as a digital camera and an image scanner, have become widespread. Thus, digital images can readily be obtained. Also, a full-color hard copy technology has rapidly developed. Especially, concerning an inkjet printing technology, a print-quality level has been comparable to that of silver-halide photographs. Thus, the inkjet printing technology has become widely used. Meanwhile, networks, such as the Internet, have become widespread. Many users are in an environment in which various devices can be connected to the networks. In such an environment in which various input-output (I/O) devices are used, color image data is input and output among devices differing in color reproduction range (color gamut) from one another, for example, in a case where a hard copy of a color image signal of a monitor having a certain color reproduction range is produced by a printer whose color reproduction range is narrower than that of the monitor.

Meanwhile, a "color management system" (hereunder referred to as "CMS") is known as a technique of performing color reproduction of a same color among different devices.

Figure 1:
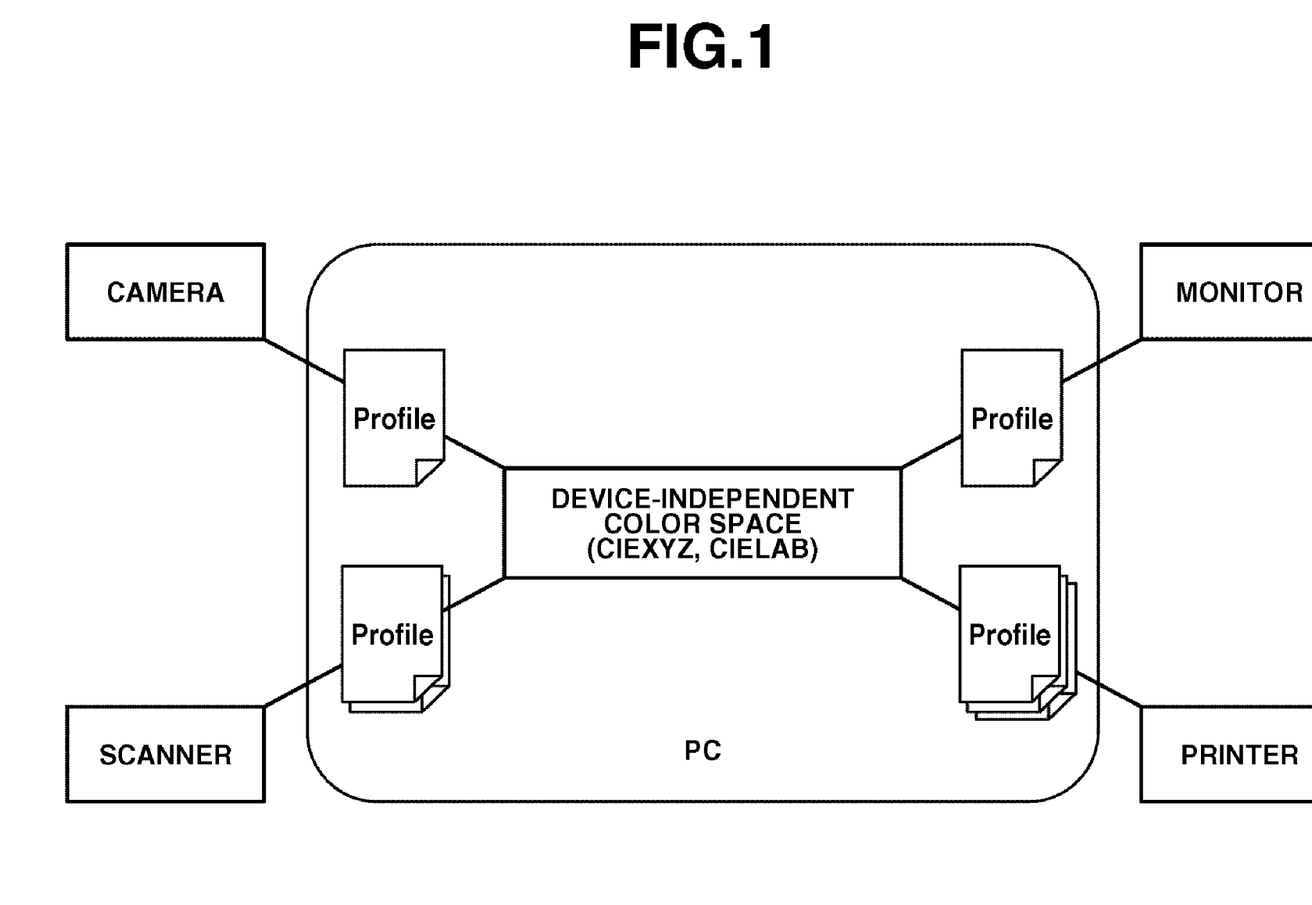
FIG. 1 illustrates an exemplary configuration of a color management system.

FIG. 1 illustrates an exemplary configuration of the CMS. FIG. 1 shows the CMS using a device-independent color space. For example, in a case where an image input device, such as a camera or a scanner shown in FIG. 1, is connected to an image output device, such as a printer or a monitor shown in FIG. 1, conversion between a color signal of an image input device and a color signal of an image output device is realized by interposing a profile group therebetween.

Each of profiles includes a transformation formula representing the relation between each device color and a device-independent color space, or includes a transformation table generated in advance as a lookup table (LUT) representing the transformation. Thus, the color conversion can be performed through the device-independent color space (for example, CIE-XYZ or CIE-L*a*b*) by using the profiles.

This system has an advantage in that image data exchange can easily be performed among systems differing from one another in input and output devices connected thereamong.

According to the CMS, a color, which can be reproduced by a certain input device, is reproduced by an output device. Thus, the technique of gamut mapping, which absorbs differences in color reproduction range among the input and output devices, is used.

Generally, individual devices differ in color gamut from one another. For example, a monitor performs color reproduction utilizing additive mixture of three primary colors, that is, red (R), green (G), and blue (B) by color development of fluorescent materials respectively corresponding to the three primary colors. Therefore, the color gamut of the monitor depends upon the kind of fluorescent materials used. Meanwhile, the color gamut of a printer varies not only with a kind of ink used but with the kind of paper used.

Figure 2:
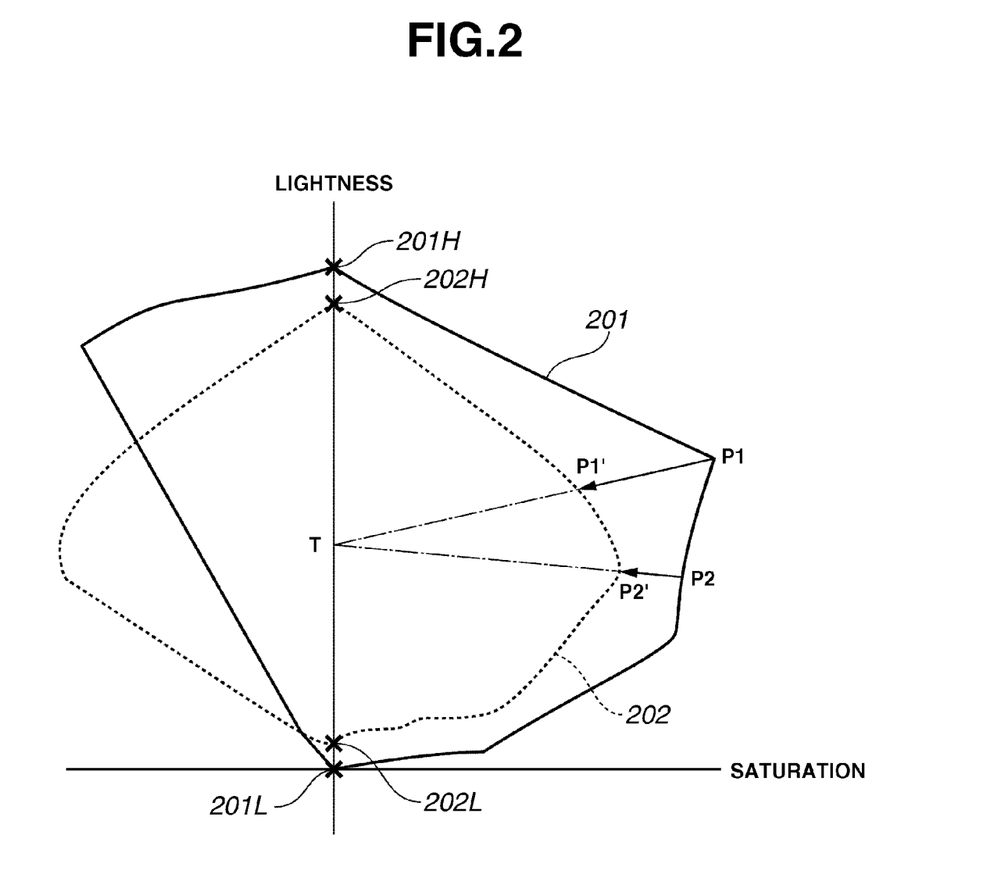
FIG. 2 is a graph illustrating the relation between a color gamut of a monitor's sRGB color space and an inkjet printer's color gamut.

FIG. 2 is a graph illustrating the relation between the color gamut of a monitor's sRGB color space and that of an inkjet printer and the relation between lightness and saturation in the case of a certain hue.

In a case where the printer's color gamut 202 is smaller than the monitor's color gamut 201 as shown in FIG. 2, when a color is within the monitor's color gamut and is outside the printer's color gamut, the color cannot be reproduced by the printer.

Therefore, in such a case, it is necessary to perform mapping of a color, which is outside of the printer's color gamut, into this gamut while original image information is maintained as much as possible. Generally, mapping of a color, which cannot physically be reproduced by a device, into a color gamut of the device by some kind of processing is referred to as "gamut compression" (or "gamut mapping").

Generally, a maximum lightness value 201H and a minimum lightness value 201L in a monitor's color gamut, which is a mapping source, are respectively different from a maximum lightness value 202H and a minimum lightness value 202L in a printer's color gamut that is a mapping destination. Although depending upon a mapping method used in the gamut compression, in this case, natural color reproduction can usually be achieved in a high saturation region of a gamut-compression result. However, in a low saturation region thereof, tonability may be degraded in a low saturation region of an image, which is output from the printer, due to the difference between the maximum lightness value and the minimum lightness value.

Hitherto, there has been known a method of performing gamut compression using a lightness value (hereunder referred to as a relative lightness value) $L^*_{std}$ obtained by normalizing a lightness value $L^*_{in}$ in a printer's color gamut, which is a mapping destination, to a lightness value $L^*_{ori}$ in a monitor's color gamut, which is a mapping source. That is, the relative lightness value $L^*_{std}$ is obtained by normalizing the lightness value $L^*_w$, which corresponds to a white color of printer paper, to 100 degrees and also normalizing the lightness value $L^*_{bk}$, which corresponds to a black color of the printer paper, to 0. Thus, the relative lightness $L^*_{std}$ is defined by the following equation (1).

$$L^*_{std} = (L^*_{in} - L^*_{bk})/(L^*_w - L^*_{bk}) \times 100 \quad (1)$$

The lightness value $L^*_w$ of the white color of the printer paper is a lightness value of a print medium, such as paper used by the printer. More specifically, the lightness value $L^*_w$ is obtained by measuring a lightness value of the medium through the use of a calorimeter. The lightness value $L^*_{bk}$ of the black color of the printer paper is a lightness value in the $L^*_a{}^*_b{}^*$ space obtained by causing the printer to output a patch, whose image is input to the printer and represented by R, G, B signals respectively having signal levels (R, G, B)=(0, 0, 0), and then performing color measurement on the patch through the use of a calorimeter.

Thus, the degradation of the tonability in the low saturation region can be suppressed by normalizing the lightness value in the color gamut of the mapping destination to the lightness value in the color gamut of the mapping source. However, the problem due to compression mapping cannot appropriately be solved only by such normalization of the lightness value.

Compression mapping also has a problem in that a tonal balance is impaired by the mapping.

In a mapping method shown in FIG. 2 in which points (P1, P2, . . . ), which are outside the printer's color gamut 202 and are within the monitor's color gamut 201, are compressed to a single point T (that is, a convergence point), the tonal balance may be impaired in an image displayed on the screen of the monitor. That is, in the example shown in FIG. 2, a rate of a change from the point P1 to the point P2 in the monitor's color gamut to the entire image displayed on the screen of the monitor is substantially equal to a rate of a change from a point P1' to a point P2', to which the point P1 and P2 are respectively mapped, in the printer's color gamut to the entire image printed on the printer paper. Thus, there is good tonal balance. However, depending on the relation between the monitor's color gamut and the printer's color gamut, when the compression mapping of compressing the points in the mapping source to a single point in the mapping destination is performed, a tonal change rate may notably be varied before and after the mapping. In this case, the image output by the printer differs in tonability from the image displayed on the screen of the monitor.

Japanese Patent Application Laid-Open No. 9-163170 describes the technique of finding a highest saturation point in an output-device's color gamut corresponding to each hue and subsequently performing compression mapping by setting a point, the corresponding lightness value of which is equal to that of the highest saturation point, on the saturation axis as a convergence point corresponding to each hue. According to this method, a convergence point can be determined in accordance with the shape of the gamut corresponding to each hue. Also, the tonal balance can be suppressed from being lost.

However, the simple compression-mapping technique employing a single convergence point has a problem in that this technique cannot prevent occurrence of reversal of a tonal change, such as a saturation change. As illustrated in FIG. 2, when the location is changed from the point P1 to the point P2 in the monitor's color gamut 201, the saturation is reduced. Conversely, when the location is changed from the point P1' to the point P2', to which the points P1 and P2 are respectively mapped, in the printer's color gamut 202, the saturation is increased. Thus, when the compression-mapping technique employing a single convergence point is performed, the reversal of various tonal changes, such as a saturation change, inevitably appears.

The reversal of various tonal changes, such as a saturation change, can be prevented by appropriately changing the convergence point of the gamut compression corresponding to each of the color gamut of the mapping source. However, in this case, the adaptive setting of the convergence point is needed. Consequently, processing is complicated.

SUMMARY OF THE INVENTION

An aspect of the invention is to simply achieve gamut mapping between devices having different color reproduction ranges in gamut compression and to enable good color reproduction without reversal of a tonal change.

Another aspect of the invention is to realize good tone reproduction in gamut compression and to reduce a processing load.

According to one aspect of the invention, an image processing method converts a color signal representing a color in a first color gamut to a color signal representing a color in a color gamut of an image forming apparatus. The image processing method includes modifying a shape of the color gamut of the image forming apparatus according to a shape of the first color gamut, and converting a color signal representing a color in the first color gamut to a color signal representing a color in the color gamut of the image forming apparatus. According to this image processing method, the modifying of the shape of the color gamut of the image forming apparatus is to change the shape of the color gamut of the image forming apparatus to a shape similar to the shape of the first color gamut.

Consequently, gamut mapping between devices having different color reproduction ranges in gamut compression can simply be achieved. Also, good color reproduction can be realized without reversal of a tonal change.

Further features of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE EMBODIMENTS

Exemplary Embodiments of the invention will be described in detail below with reference to the accompanying drawings.

Figure 3:
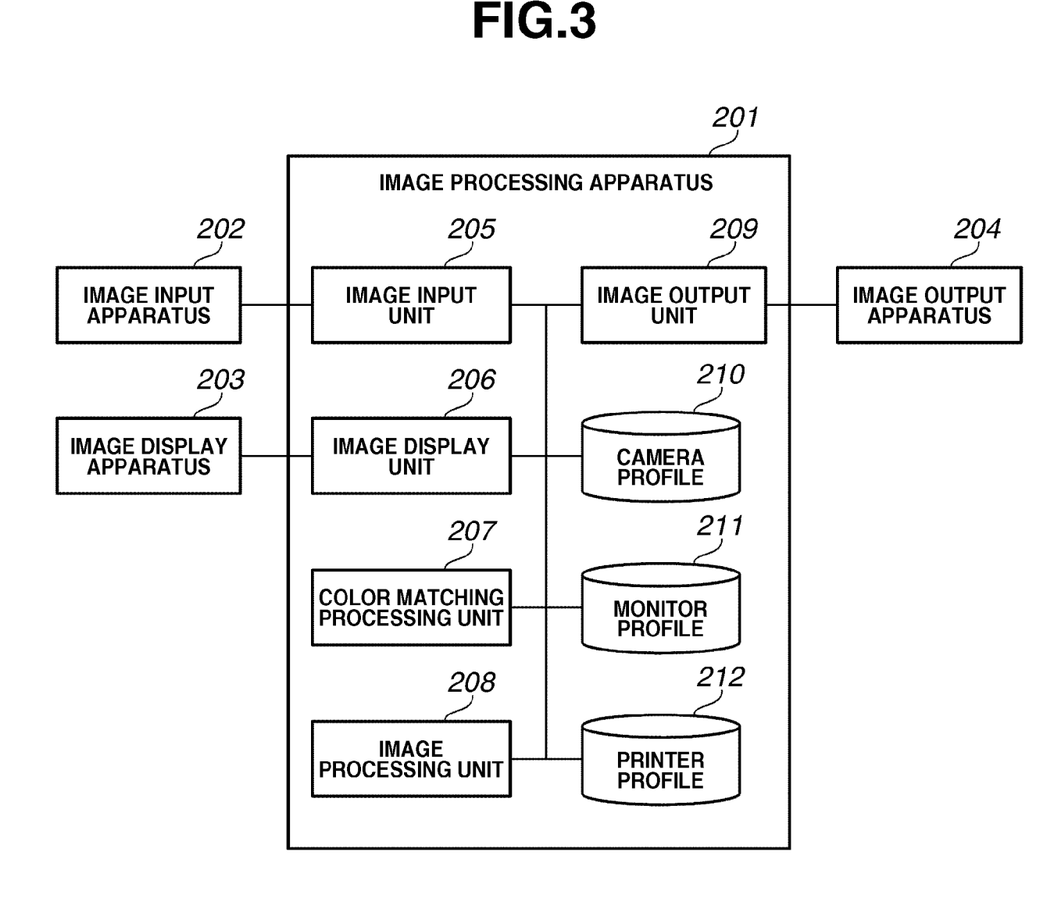
FIG. 3 is a block diagram illustrating an image processing system according to an exemplary embodiment of the present invention.

FIG. 3 is a block diagram illustrating an image processing system according to an exemplary embodiment of the present invention.

FIG. 3 shows an example of the configuration of a CMS. More specifically, the CMS is a system configured so that an image processing apparatus 201 performs color conversion by using a profile when an image input by an image input apparatus 202 is output to an image display apparatus 203. The image processing apparatus 201 performs color conversion by using a profile when an image input by an image input apparatus 202 is output to an image output apparatus 204, and also performs color conversion by using a profile when an image displayed on the image display apparatus 203 is output to the image output apparatus 204. The image input apparatus 202 is, for example, a camera, a scanner or other related or equivalent apparatus and/or methods as known by one of ordinary skill in the relevant art, which inputs images. The image display apparatus 203 is, for example, a monitor or other related or equivalent apparatus and/or methods as known by one of ordinary skill in the relevant art, which displays images. The image output apparatus 204 is, for example, a printer or other related or equivalent apparatus and/or methods as known by one of ordinary skill in the relevant art, which prints an image. For example, an inkjet printer and an electrophotographic printer can be used as the printer.

The image processing apparatus 201 is, for example, a personal computer and performs processes, such as a color conversion and the generation of profiles according to the exemplary embodiment. An image input unit 205 takes in image signals from the image input apparatus 202. An image display unit 206 generates a display image signal and controls a display in the image display apparatus 203.

A color matching unit 207 performs color matching on images, which are input by the image input apparatus 202 and are displayed by the image display apparatus 203, and image signals, which are output to the image output apparatus 204, by using profiles 210, 211, and 212. For example, in a case where an image to be displayed in the image display apparatus 203 is output from the image output apparatus by printing, the color conversion of an image signal representing an image displayed by the image display apparatus 203 is performed by using a monitor profile 211 and a printer profile 212. Thus, an image signal representing a color in the color gamut of the image output apparatus 204 is generated. The profiles used here are obtained by using a lookup table (LUT) generated in each embodiment of the present invention, which will be described later.

The image processing unit 208 performs color separation and gamma correction on image signals representing colors in the color gamut of the image output apparatus 204, which are obtained by the color matching unit 207, to convert such image signals into signals corresponding to a color material, such as ink, used in the image output apparatus 204. The image output unit 209 outputs print signals to the image output apparatus 204 according to the image signals obtained by the image processing unit 208.

The image processing apparatus 201 also generates a camera profile 210, a monitor profile 211, and a printer profile 212, which will be described later.

Hereinafter, exemplary embodiments configured as shown in FIG. 3 and adapted to generate profiles are described below.

First Embodiment

A first exemplary embodiment performs gamut compression by a calorimetric matching algorithm. That is, in a case where mapping of a color in the monitor's color gamut to a color in the printer's color gamut is performed, a color, which is included in both the monitor's color gamut and the printer's color gamut, is faithfully mapped to a calorimetrically matched color. Meanwhile, a color, which is outside the printer's color gamut, undergoes compression mapping. The mapping destination is set to be an outer part (that is, a boundary part) of the printer's color gamut.

Figure 4:
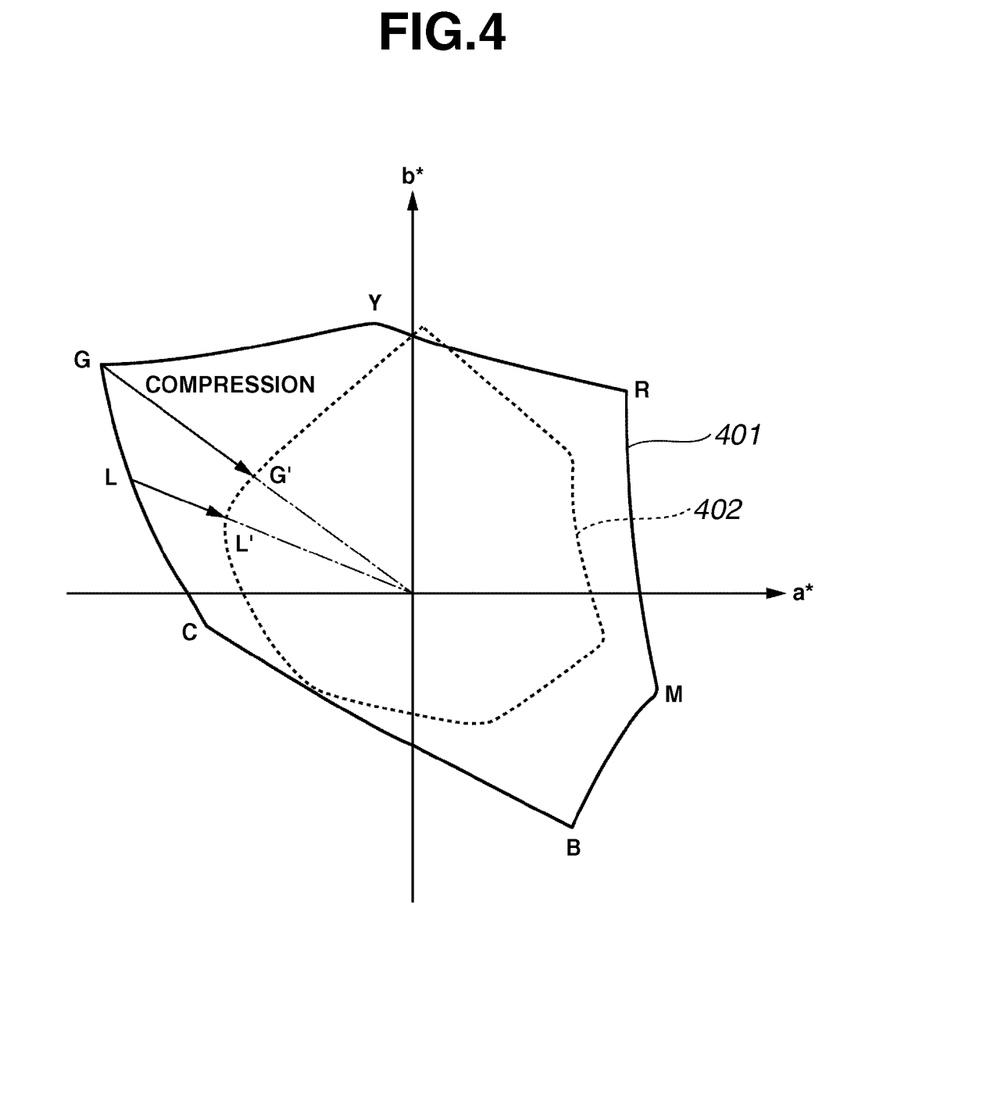
FIG. 4 is a graph illustrating an exemplary reversal of a change in saturation in a direction of a hue angle, which is a problem to be solved by the embodiment of the present invention.

FIG. 4 is a graph illustrating an exemplary reversal of a change in saturation in the direction of a hue angle, which is a problem to be solved by the embodiment of the present invention. The monitor's color gamut 401 and the printer's color gamut 402 are represented by color signals relating to grids (or lattice points) of the LUT. That is, color signals output from the monitor prescribe the grids. When a color signal is input from the monitor to the LUT, a color signal representing lattice point data, which corresponds to the prescribed grid, is output from the printer. Colors indicated by the color signals are represented in an a*b* coordinate system as a color in a CIE LAB color space. For instance, the color gamuts are discretely represented by 729 grids. Colors other than those represented by the grids are obtained by linear interpolation using grid data. Thus, the color space shown in FIG. 4 can be obtained.

As shown in FIG. 4, generally, the hues of primary colors (red (R), green (G), blue (B), cyan (C), magenta (M), and yellow (Y)) in the monitor's color gamut, which is the first color gamut, are deviated from those in the printer's color gamut, which is the second color gamut. Consider a case, focusing attention on the colors G and L, where the compression mapping of a color G, which has the hue of green (G), and a color L, which is obtained by changing a hue angle in the hue direction toward C, is performed in a direction of in a lightness axis respectively. A point (or color) G is mapped onto a boundary point G' in the color gamut 402. Also, a point (or color) L is mapped onto a boundary point L'. In this case, as can be seen from FIG. 4, the saturation at the point G is decreased up to the point L, while the saturation at the point G' is increased up to the point L'. Thus, the compression mapping may cause the reversal of the saturation or of a change in the saturation.

To solve this problem, the first embodiment performs the "deletion" of a part of the printer's color gamut as a first process.

Figure 5:
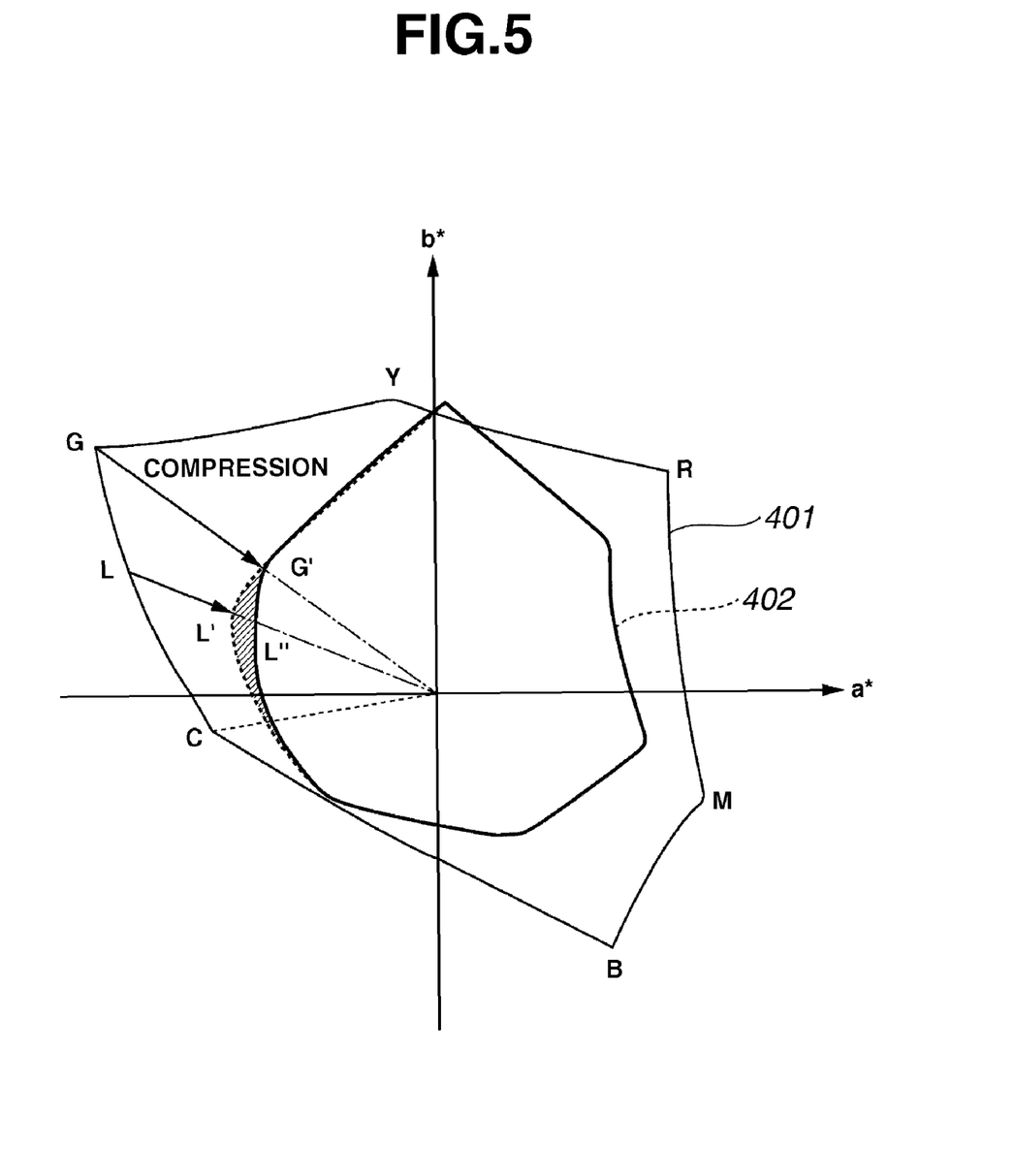
FIG. 5 is a graph illustrating an exemplary deletion of a printer's color gamut.
Figure 6:
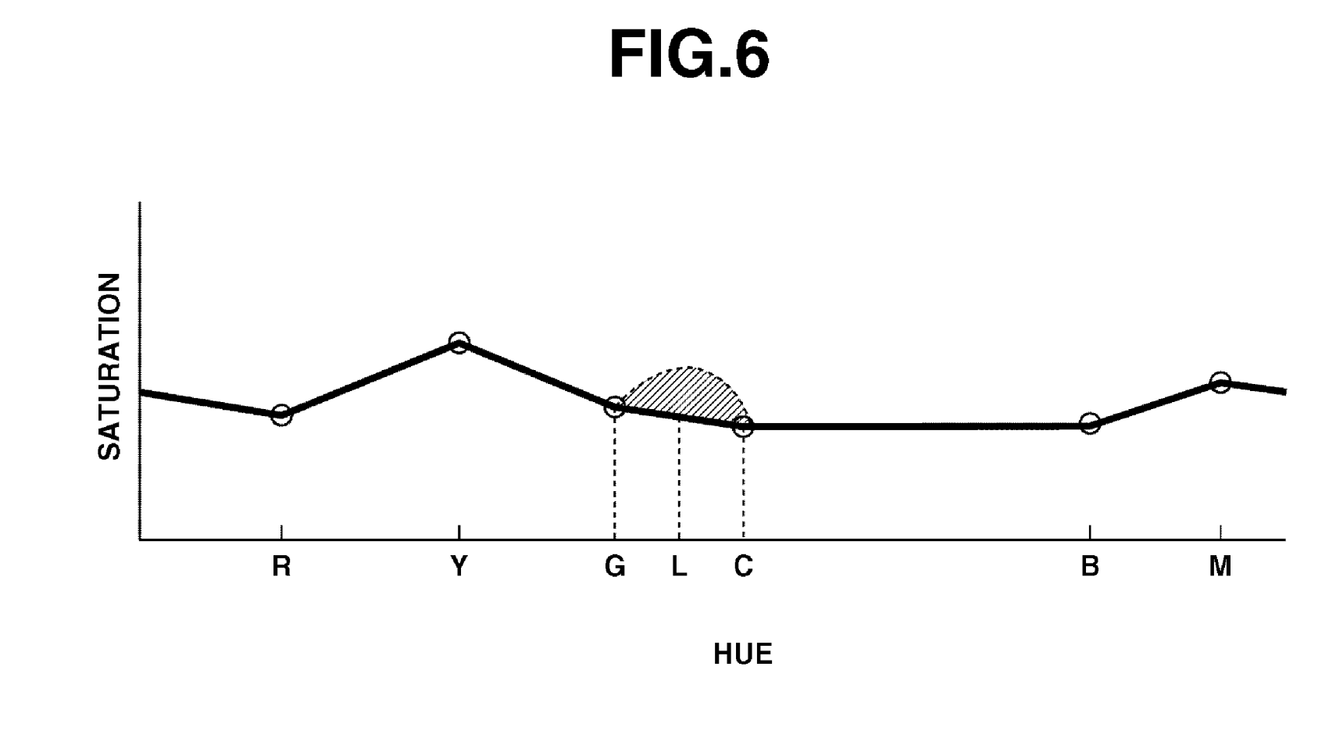
FIG. 6 is a graph illustrating a saturation conversion curve with respect to a color hue.

FIG. 5 is a graph illustrating an exemplary deletion of a part of the printer's color gamut. As illustrated in FIG. 5, apart hatched with oblique lines in the printer's color gamut is deleted. More specifically, a saturation conversion curve with respect to the hue is determined corresponding to each of predetermined lightness values, as shown in FIG. 6. Then, the saturation conversion curves are applied to the grid data representing the printer's color gamut. Thus, the deletion of the part of the printer's color gamut is performed. That is, as illustrated in FIG. 6, the abscissas designate the hue angle in the color gamut. Reference characters R, Y, G, C, B, and M denote the primary colors or the hues thereof in the monitor's color gamut. Also, ordinates denote maximum saturations corresponding to the hue angles in the printer's color gamut. In the case of the present embodiment, the maximum saturation point corresponding to each of the primary colors is plotted with a white circle. A curve obtained by connecting the white circles by line segments, as shown in FIG. 6, is determined as the saturation conversion curve. Then, the saturation conversion curve is applied to the grid data, as described above. Subsequently, the saturation value, which is larger than that shown by the saturation conversion curve, of a point corresponding to each primary color is reduced to the saturation value corresponding thereto.

For example, in a case where the lightness value ranges from 0 to 100 degrees, this process is performed every 10 degrees. Consequently, as illustrated in FIG. 6, a part corresponding to colors having saturation values is deleted, which are higher than those indicated by the curve obtained by connecting the maximum saturation values at the primary colors by line segments (for instance, the part indicated by the oblique lines between the hues G and C). This process is performed every predetermined lightness value. Consequently, the monitor's color gamut 401 is modified to reduce the saturation of a portion corresponding to the deleted part of the printer's color gamut 402, which part would be obtained by the compression mapping. The point L located on the monitor's color gamut 401 is mapped onto the point L". Consequently, a tonal change between the point G' located on the printer's color gamut 402 and the point L" is substantially equal to that between the point G and the point L on the monitor's color gamut 401 (that is, the tonal change between the point G' and the point L" has a same tendency as that of the tonal change between the point G and the point L). That is, the saturation value is decreased in both the direction from the point G' to the point L" and the direction from the point G to the point L. Consequently, the tonal change, which does not cause the reversal of the saturation change due to the compression mapping, can be realized.

The foregoing example has described the definition of the saturation conversion curve connecting the maximum saturation points respectively corresponding to the hues of the primary colors by line segments. However, the deletion of a part of the color gamut may be performed by using a curve with a higher degree of continuousness, for example, a spline curve.

Subsequently, a process of modifying the printer's color gamut and changing a color (or point), which has the maximum saturation value in the printer's color gamut, to a color having the same hue as that of a color, which has the maximum saturation value in the monitor's color gamut, is performed as a second process in the first embodiment.

As described with reference to FIG. 2, when the gamut compression toward a specific point is performed, the reversal of the saturation may occur. To solve this problem, the deletion of a part of the printer's color gamut is performed as the first process so that the saturation values are partly reduced in the printer's color gamut, and thus, the reversal of the saturation illustrated in FIG. 2 may be simultaneously solved. However, the reversal of the saturation can be solved by performing the second process in the first embodiment. The second process can decrease a size of the part that is reduced by performing the first process, and the color gamut of the printer's color gamut is prevented from being excessively deleted. Moreover, the appearance of an output result of the printer is prevented from being deteriorated by performing the first process. It is effective to control the amount, which is deleted by the first process, by performing the second process. That is, the amount to be deleted by the first process can be determined by comprehensively analyzing the deterioration of the appearance and the difference in the tonal change in the hue direction according to an output image.

Figure 7:
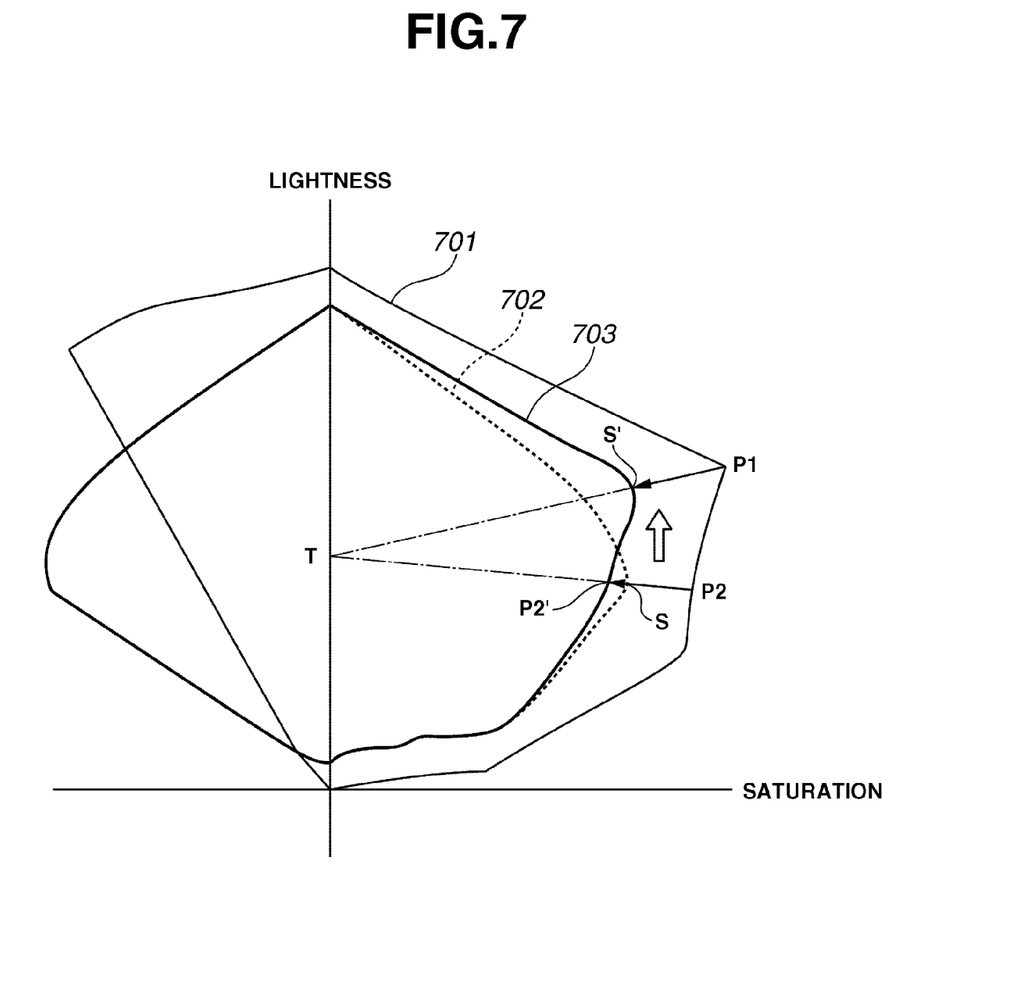
FIG. 7 is a graph illustrating an exemplary modification of a color gamut according to the embodiment of the present invention.

FIG. 7 is a graph illustrating the modification of the color gamut according to the second process performed in the exemplary embodiment of the present invention. As illustrated in FIG. 7, the modification of the color gamut is performed so that the maximum saturation point S located on the printer's color gamut 702, which is indicated by a dashed line, is changed to a point S' located on a line segment connecting a convergence point T of the compression mapping to the maximum saturation point P1 on the printer's color gamut 703. That is, the color gamut 702 is modified to a printer's color gamut 703 indicated by a solid line.

Consequently, when the compression mapping of a color, which is included in the monitor's color gamut 701 and is outside the printer's color gamut, to the convergence point T, the color P1 having the maximum saturation value in the monitor's color gamut is mapped onto the color S' having the maximum saturation value in the printer's color gamut 703. Consequently, in a case where the saturation value is decreased in the direction of the point P1 to the point P2 in the monitor's color gamut 701, the saturation value is similarly reduced in the direction from the point S' to the point P2', to which the points P1 and P2 are respectively mapped, on the color gamut 703. Thus, the reversal of the saturation does not occur.

Figure 8:
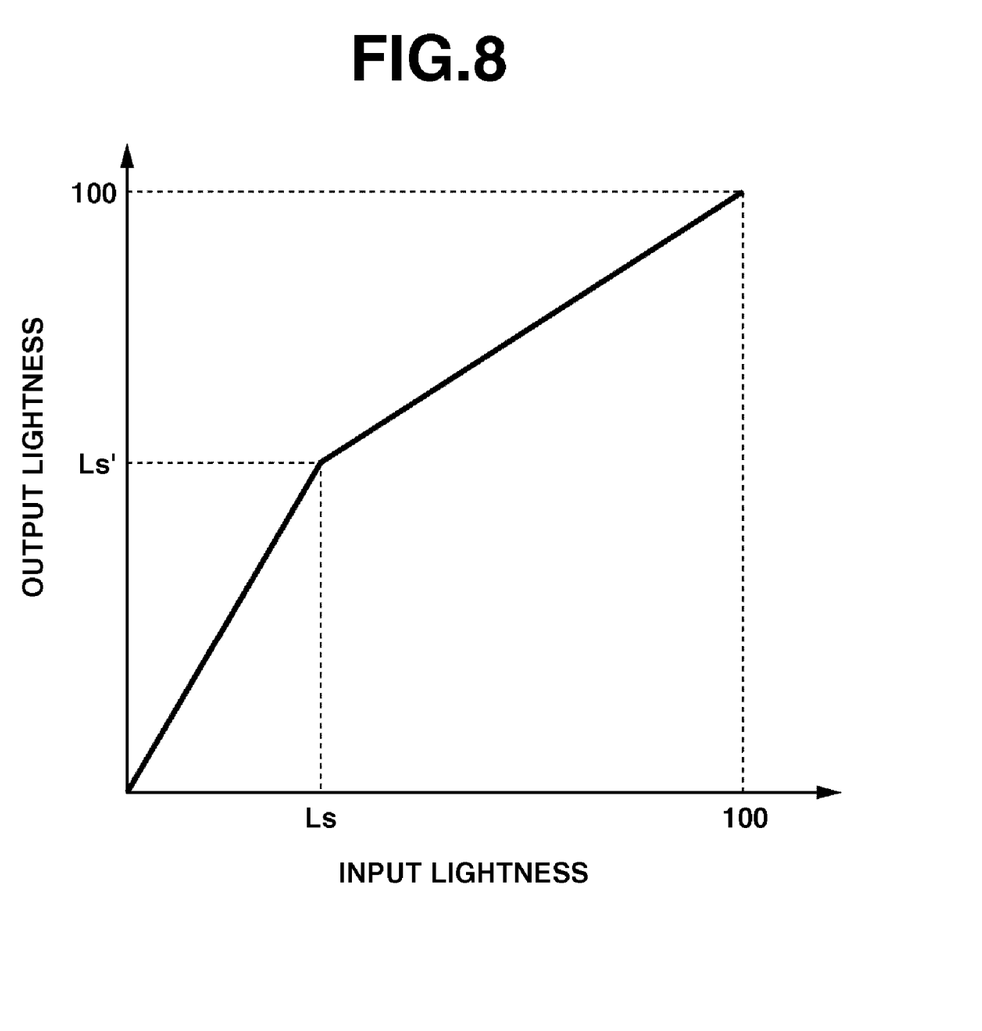
FIG. 8 is a graph illustrating an exemplary process of increasing lightness in a color gamut according to the embodiment of the present invention.

FIG. 8 is a graph illustrating the modification of the color gamut according to the first exemplary embodiment of the present invention, which has been described above. As shown in FIG. 8, the first exemplary embodiment performs the modification that increases the lightness corresponding to each color. That is, a relatively high-rate (or large-gradient) linear transformation is performed on the colors of the range up to the maximum saturation point S having the lightness value $L_s$ in the printer's color gamut 702 so that the lightness value $L_s$ is converted to the lightness value $L_{s'}$ of the maximum saturation point S' in the modified color gamut 703. Also, a relatively low-rate (or small-gradient) linear transformation, whose low-rate is lower than the rate of the linear transform performed on the colors having the lightness values ranging from 0 to $L_{s'}$, is performed on the colors having the lightness value, which is higher than the lightness value $L_s$. The transformation shown in FIG. 8 is performed not only on the boundary of the printer's color gamut 702 but on the internal colors.

The modification of the color gamut does not mean that the printer's actual color reproduction range is modified. For example, in the case of an inkjet printer, the actual color reproduction range is determined by the characteristics of the ink and printer paper used. The predetermined color reproduction range of the printer is represented like the color gamut 702 in a device-independent color space, such as the L*a*b* color space. Then, the transformation illustrated in FIG. 8 is performed in the device-independent color space to make the actual color reproduction range correspond to the color gamut 703. The above-described compression mapping relation is established between the actual color reproduction range and the monitor's color gamut 703 through the transformation in the color space. Consequently, when the saturation is reduced in the direction from a certain point to another certain point in the monitor's color gamut, the saturation is similarly reduced in the direction from a point to another point in the actual color reproduction range, to which the certain points are mapped, so that the reversal of the saturation does not occur.

In the first exemplary embodiment, the above-described "modification" can be applied to the monitor's color gamut 701. Consequently, the relative positional relation between the two color gamuts is stored. Thus, especially, the relative positional relation among colors of the color gamuts, which do not need compression mapping, can be stored. Consequently, enhancement of the mapping accuracy of regions, which do not need compression, is enabled.

When the "modification" is applied to the monitor's color gamut, the "modification" is not applied to the outermost part of the monitor's color gamut. This can be realized by, for example, reducing the degree of application of the "modification" toward the outermost part of the monitor's color gamut. More specifically, this can be realized by, for instance, weighting a modified amount according to a distance from the central point (S) of the "modification".

As described above, according to the first embodiment, the "deletion" of a part of the printer's color gamut is performed by the first process. Also, the "modification" of the printer's color gamut is performed by the second process. Furthermore, the "modification" is also applied to a part of the monitor's color gamut. Consequently, even in a case where the compression mapping toward a specific point is used, the reversal of a tonal change, such as a saturation change, can be suppressed.

While the case of generating the LUT based on profiles for color conversion has been described in the foregoing description, the present invention can be applied to a case where the color conversion is performed without using the LUT.

In the foregoing description, the color gamut of the sRGB monitor is used as the first color gamut, which is to be mapped, by way of example. However, the first color gamut is not limited thereto. Any color gamut other than the color gamut of the sRGB monitor may be used as the first color gamut.

With the above-described configuration, a part of the second color gamut, such as the color gamut of a printer, is deleted so that a part of the second color gamut, which is obtained by compression mapping, causes a tonal change having a same tendency as that of a tonal change occurring in a corresponding part of the first color gamut of an image display apparatus, such as a monitor. Consequently, for example, a saturation change in the hue angle direction and a saturation change in the direction of lightness in the first color gamut can be set to have a same tendency as that of a saturation change caused in the second color gamut. Thus, the reversal of the tonal change, such as the saturation change, can be suppressed. Also, the second color gamut is modified so that a specific color in the first color gamut is mapped onto a color corresponding to the specific color in the second color gamut by compression-mapping. Thus, the colors having the maximum saturation values respectively corresponding to both of the color gamuts are made to correspond to each other by mapping. Consequently, the saturation change can be made to have the same tendency in both of the color gamuts. Thus, the reversal of the tonal change, such as the saturation change, can be suppressed.

Second Embodiment

According to a second exemplary embodiment, the present invention is applied to gamut mapping utilizing perceptual compression mapping.

The second exemplary embodiment differs from the first exemplary embodiment in that while the first exemplary embodiment performs gamut compression by the calorimetric matching algorithm, so that all of colors in the printer's color gamut are mapped without any change, the second exemplary embodiment performs mapping so that colors of a high saturation region in the monitor's color gamut are forced to be mapped into a certain high saturation region in the printer's color gamut.

More specifically, as described in the foregoing description of the first exemplary embodiment, a part including colors, whose distances from the convergence point are less than 80% of the distance between the convergence point and the outermost point of the color gamut corresponding to each hue angle, is set to be an area to which mapping according to the calorimetric matching algorithm is performed. Colors in the monitor's color gamut are mapped to the remaining 20% part of the printer's color gamut other than the area, to which mapping according to the calorimetric matching algorithm is performed, by compression mapping.

Thus, the above-described conditions for mapping are set for the second exemplary embodiment. Consequently, compression mapping, by which the reversal of the tone is difficult to occur, can simply be realized while maintaining the property of the compression mapping, according to which colors are mapped to a specific point.

Third Embodiment

According to a third exemplary embodiment of the present invention, the present invention is applied to gamut mapping utilizing saturation compression mapping.

According to the first exemplary embodiment and the second exemplary embodiment, the "deletion" of a part of the color gamut is performed to prevent the reversal of saturation. This technique can be applied to what is called "monitor matching" so that the appearance of an output of the monitor is matched with the appearance of an output of the printer as much as possible. However, this technique suppresses color reproduction ability of the printer. In view of this respect, the second exemplary embodiment performs the compression mapping that utilizes reproduction ability of the printer as much as possible, rather than the monitor matching. That is, the third exemplary embodiment performs the "modification" of the color gamut without performing the "deletion" of a part of the color gamut.

More specifically, the third exemplary embodiment performs the "modification" as the second process, instead of the "deletion". For example, the third embodiment performs hue conversion so that the hue angle of each of the primary colors G, C, B, M, R, and Y in the printer's color gamut 402 is made to be matched with a corresponding one of the hue angles of the primary colors G, C, B, M, R, and Y in the printer's color gamut 401. Consequently, according to the compression mapping after the modification of the color gamut, the maximum saturation point corresponding to each of primary colors in the monitor's color gamut of the monitor is mapped onto the maximum saturation portion corresponding to each of primary colors in the monitor's color gamut of the printer. Consequently, the reversal of the saturation change in the direction of the hue angle is difficult to occur. Also, the mapping maintaining the saturation is enabled.

Also, the third embodiment can perform the "modification" in the direction of lightness, which has been described in the foregoing description of the first embodiment. Consequently, the saturation compression mapping, by which the reversal of the tonal change is made to be difficult to occur, can easily be realized by utilizing the compression mapping, according to which colors are mapped to a specific point.

The foregoing description of the fourth embodiment describes only an example of the saturation compression mapping. The compression mapping according to the present invention is not limited thereto.

Fourth Embodiment

In the first and second exemplary embodiments, the color gamuts of the monitor and the printer are adjusted by performing the "deletion" of the color gamut as the first process, and the "modification" of the color gamut as the second process. This enables the compression mapping, which prevents the reversal of the tonal change from occurring, while the relative positional relation therebetween is maintained. The third embodiment has described the compression mapping utilizing the "modification" of the color gamut as the second process. The fourth exemplary embodiment performs compression mapping by combining the "deletion" of the color gamut with the "modification" thereof.

The gamut compression is to compress a color gamut, which includes irreproducible colors, to make an original color correspond to a color different from the original color. That is, the gamut compression is to permit some kind of deception to make a person misconceive a color, which is similar to an original color, as the original color. From this standpoint, the first and second exemplary embodiments perform the gamut compression by causing some kind of deception to make a person misconceive lightness and saturation in a state in which the hue is maintained as much as possible. The third exemplary embodiment performs the gamut compression by causing some kind of deception to make a person misconceive hue and saturation in a state in which the saturation is maintained as much as possible.

It usually depends upon the sensory property of a person to determine what balance among three elements, that is, hue, saturation and lightness can be used for varying the three elements when an original color is made to correspond to a different color by some kind of deception. Generally, significant gamut compression can be realized by maintaining the hue. However, gamut compression can be realized by mapping a color of a hue onto a color of a similar hue having a higher saturation value corresponding to an amount of compression of the saturation. For example, a blue color is mapped onto a blue color having a higher saturation value, and red color is mapped onto a red color having a higher saturation value.

The fourth embodiment can optionally and easily realize a desirable balance. While the foregoing third exemplary embodiment has described the "modification" according to which the primary colors of the printer's color gamut are made to coincide with those of the monitor's color gamut, the fourth exemplary embodiment limits an amount of hue conversion to a necessary amount of hue conversion. For instance, to map a blue color to a cyan-like color, the hue of the blue color in the printer's color gamut is "modified" by a hue angle of (−10) degrees. Similarly, to map a red color to a magenta-like color, the hue of the red color in the printer's color gamut is "modified" by a hue angle of (−5) degrees.

Thus, the fourth exemplary embodiment first performs the "modification" of the printer's color gamut by taking the favorability of the gamut compression into account. As described above, the relative positional relation among colors is maintained by applying the same "modification" to a part of the monitor's color gamut, which is included in the printer's color gamut.

Also, the fourth exemplary embodiment performs the "deletion" of a part of the color gamut, which has been described in the foregoing description of the first and second embodiments, to prevent the reversal of saturation from occurring when the gamut compression is performed. Additionally, the fourth embodiment applies the "modification" of the color gamut so that a maximum saturation point of the printer's color gamut is mapped to a point on a straight line connecting a maximum saturation point of the monitor's color gamut to a predetermined lightness point.

As described above, the fourth exemplary embodiment first performs the "modification" relating to the hue by taking the "deception", which is involved in the gamut compression, into consideration. Then, the fourth embodiment performs the "deletion" of a part of the color gamut to prevent occurrence of the reversal of saturation. Additionally, the fourth embodiment performs the "modification" to enable convergence to a predetermined lightness value. Thus, more desirable gamut compression can be realized.

Other Embodiments

The features of the present invention can be achieved by providing a software program code, which can implement the functions of the above-described embodiments, to a computer of an apparatus or a system connected to various devices so as to operate the various devices. Also, a computer (or a central processing unit (CPU) or a micro-processing unit (MPU)) of the system or the apparatus can operate the various devices according to the program code stored in the recording medium.

In this case, the program code itself read from the recording medium implements the functions of the above-described exemplary embodiments.

For example, a floppy disk, a hard disk, an optical disk, a magnetooptical disk, a compact disk—read-only memory (CD-ROM), a CD-recordable (CD-R), magnetic tape, a non-volatile memory card, and ROM may be employed as the recording medium for supplying the program code.

The functions of the above-described embodiments can be implemented not only by executing the read program code in the computer but by performing part or all of actual processing according to instructions, which are issued by the program code, by an OS (Operating System) running on the computer.

The functions of the above-described embodiments can also implemented by performing part or all of the actual processing by a CPU or the like, which is provided in a function expansion board inserted into the computer or in a function expansion unit connected to the computer, according to instructions issued by program code that is read from the storage medium after written to a memory provided on the function expansion board of the computer or on the function expansion unit connected to the computer.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

What is claimed is:

1. An image processing method for converting a color signal representing a color in a first color gamut to a color signal representing a color in a color gamut of an image forming apparatus, the image processing method comprising:
   modifying a shape of the color gamut of the image forming apparatus according to a shape of the first color gamut so as to change the shape of the color gamut of the image forming apparatus to a shape similar to the shape of the first color gamut; and
   converting a color signal representing a color in the first color gamut to a color signal representing a color in the modified color gamut of the image forming apparatus based on a convergence point in the modified color gamut,
   wherein modifying of the shape of the color gamut of the image forming apparatus comprises deleting a part of the color gamut of the image forming apparatus which has saturation values higher than threshold values represented by a threshold line obtained by connecting maximum saturation values of the image forming apparatus' color gamut that correspond to hues of primary colors in the first color gamut, and
   wherein deleting the part of the color gamut of the image forming apparatus is performed for suppressing a reversal of a tonal change based on the converting of the color signal.

2. The image processing method according to claim 1, wherein modifying the shape of the color gamut of the image forming apparatus comprises deleting a part of the color gamut of the image forming apparatus which has saturation values higher than threshold values represented by a threshold line obtained by connecting maximum saturation values that correspond to hues of primary colors in the first color gamut and are in the image forming apparatus' color gamut.

3. The image processing method according to claim 2, wherein modifying the shape of the color gamut of the image forming apparatus is performed for a plurality of lightness in the image forming apparatus' color gamut.

4. The image processing method according to claim 1, wherein modifying the shape of the color gamut of the image forming apparatus comprises placing a maximum saturation point, which corresponds to one of hues in the image forming apparatus' color gamut, on a line connecting a maximum saturation point, which corresponds to the one of hues in the first color gamut, to a predetermined point on an achromatic color axis of the color gamut.

5. The image processing method according to claim 4, further comprising changing the shape of the first color gamut.

6. The image processing method according to claim 1, wherein converting a color signal representing a color in the first color gamut to a color signal representing a color in the color gamut of the image forming apparatus is performed using gamut compression in a LAB color space.

7. The image processing method according to claim 1, wherein the first color gamut is defined to be an RGB color space.

8. An image processing apparatus including a processor configured to convert a color signal representing a color in a first color gamut to a color signal representing a color in a color gamut of an image forming apparatus, the image processing apparatus comprising:
   a modification unit configured to modify a shape of the color gamut of the image forming apparatus according to a shape of the first color gamut so as to change the shape of the color gamut of the image forming apparatus to a shape similar to the shape of the first color gamut; and
   a conversion unit configured to, using the processor, convert a color signal representing a color in the first color gamut to a color signal representing a color in the modified color gamut of the image forming apparatus based on a convergence point in the modified color gamut,
   wherein the modifying of the shape of the color gamut of the image forming apparatus comprises deleting a part of the color gamut of the image forming apparatus which has saturation values higher than threshold values represented by a threshold line obtained by connecting maximum saturation values of the image forming apparatus' color gamut that correspond to hues of primary colors in the first color gamut, and
   wherein deleting the part of the color gamut of the image forming apparatus is performed for suppressing a reversal of a tonal change based on the converting of the color signal.

9. A non-transitory computer-readable storage medium having computer-executable instructions stored thereon for performing an image processing method for converting a color signal representing a color in a first color gamut to a color signal representing a color in a color gamut of an image forming apparatus, the computer-executable instructions stored on the computer-readable storage medium for performing a method comprising:
   modifying a shape of the color gamut of the image forming apparatus according to a shape of the first color gamut so as to change the shape of the color gamut of the image forming apparatus to a shape similar to the shape of the first color gamut; and
   converting a color signal representing a color in the first color gamut to a color signal representing a color in the modified color gamut of the image forming apparatus based on a convergence position in the modified color gamut,
   wherein modifying of the shape of the color gamut of the image forming apparatus comprises deleting a part of the color gamut of the image forming apparatus which has saturation values higher than threshold values represented by a threshold line obtained by connecting maximum saturation values of the image forming apparatus' color gamut that correspond to hues of primary colors in the first color gamut, and
   wherein deleting the part of the color gamut of the image forming apparatus is performed for suppressing a reversal of a tonal change based on the converting of the color signal.

10. A method for generating a lookup table for converting a color signal representing a color in a first color gamut to a color signal representing a color in a color gamut of an image forming apparatus, the method comprising:
   modifying a shape of the color gamut of the image forming apparatus according to a shape of the first color gamut so as to change the shape of the color gamut of the image forming apparatus to a shape similar to the shape of the first color gamut; and
   converting a color signal representing a color in the first color gamut to a color signal representing a color in the modified color gamut of the image forming apparatus based on a convergence position in the modified color gamut,
   wherein modifying of the shape of the color gamut of the image forming apparatus is performed for suppressing a reversal of a tonal change based on the converting of the color signal,
   wherein modifying the shape of the color gamut of the image forming apparatus comprises deleting a part of the color gamut of the image forming apparatus which has saturation values higher than threshold values represented by a threshold line obtained by connecting maximum saturation values of the image forming apparatus' color gamut that correspond to hues of primary colors in the first color gamut, and
   wherein deleting the part of the color gamut of the image forming apparatus is performed for suppressing a reversal of a tonal change based on the converting of the color signal.

* * * * *